UNITED STATES PATENT OFFICE.

CHARLES STINEMAN GILBERT AND JAMES FRANKLIN THOMPSON, OF MILLERSBURG, PENNSYLVANIA.

LUBRICANT.

SPECIFICATION forming part of Letters Patent No. 576,307, dated February 2, 1897.

Application filed November 21, 1895. Serial No. 569,634. (No specimens.)

*To all whom it may concern:*

Be it known that we, CHARLES STINEMAN GILBERT and JAMES FRANKLIN THOMPSON, citizens of the United States, and residents of Millersburg, in the county of Dauphin and State of Pennsylvania, have invented a certain new and useful Compound for Use as an Antifriction Lubricant and Journal-Cooler, of which the following is a specification.

This invention consists of a liquid metallic composition or compound which is adapted for use as an antifriction lubricant and journal-cooler and which consists of the following ingredients combined in the proportions below set out, and said ingredients and said proportions being substantially as follows, the gallon being employed as a standard and for the purposes of convenience: first, one gallon of mineral lubricating-oil of low specific gravity; second, one gallon of mineral lubricating-oil of high specific gravity; third, one gallon of lime-water; fourth, one quart of rosin-oil; fifth, one pound of sulfate of soda; sixth, one pound of black antimony; seventh, one-half pound carbonate of magnesium, (powdered.)

In preparing the above-named articles and combining the same we first slack freshly-burnt lime and add sufficient water to make it the consistency of ordinary whitewash, and when the lime has subsided and the liquor has become clear decant or pour off the clear water, and this will form the lime-water employed in the compound. We then take one gallon of lime-water thus produced and add one pound of sulfate of soda and heat the product until a temperature of about 90° to 95° is reached, and hold the same at this temperature until the soda is entirely dissolved. To this warm solution we add the one pound of black antimony, chemically known as "sulfuret of antimony," ($Sb_2S_3$,) and the one-half pound of carbonate of magnesium and allow the product to stand for six hours or thereabout, and to this product add the one gallon of mineral lubricating-oil of light specific gravity and the one quart of rosin-oil. We then place this compound in a mixing-mill, such as is used in the manufacture of ready-mixed paints, and to this compound we add one gallon of mineral lubricating-oil and mix all thoroughly, and after the same has been thoroughly mixed and compounded in the mixing-mill it is thrown off and strained and put into barrels or cans.

In preparing this compound the following directions should be observed: For a light-bodied lubricant, such as meets the requirements of high-speed engines and high-speed machinery, the last gallon of lubricating-oil which is added must be of the highest specific gravity, approximately 0.871, and for heavy stationary engines and slow-running machinery all the oil employed may be of the same or nearly the same specific gravity of approximately 0.880. For a heavy compound the last gallon of mineral oil added should be composed of petroleum residuum, commonly known as "tank-bottoms," and this constitutes a compound unsurpassed for railroad-cars, heavy mining machinery, cranes, very heavy bearings, &c., and will surpass and supplant what is now on the market known as "axle-grease."

Our improved compound or liquid lubricant and journal-cooler will not settle to the bottom of the barrel or can or become solidified, but will remain in a perfect fluid condition, the various parts remaining in complete suspension and solution therein.

It is evident that slight changes in and modifications of the formula herein given, and also in the directions for its preparation, may be made without departing from the spirit of our invention or sacrificing its advantages, and we may also, under certain conditions, omit one gallon of the mineral oil which forms a part of the compound, it being observed that two gallons are employed in the formula, one of which is of greater specific gravity than the other.

Having fully described our invention, we claim and desire to secure by Letters Patent—

The composition herein described, consisting of as follows: one gallon of mineral oil, of low specific gravity, one gallon of mineral oil of high specific gravity, one gallon of lime-water, one quart of rosin-oil, one pound of sulfate of soda, one pound of black antimony, and one-half a pound of magnesium, said parts being mixed and combined substantially as described.

In testimony that we claim the foregoing as our invention we have signed our names, in presence of the subscribing witnesses, this 16th day of November, 1895.

CHARLES STINEMAN GILBERT.
    JAMES FRANKLIN THOMPSON.

Witnesses:
 GEO. W. KLINE,
 N. P. THOMPSON.